May 3, 1966  J. H. COOPER ETAL  3,249,732
FLASH WELDING APPARATUS
Filed Jan. 5, 1960  7 Sheets-Sheet 1

INVENTORS
JOSEPH H. COOPER
MELVIN M. SEELOFF
BY Francis J. Klempay
ATTORNEY

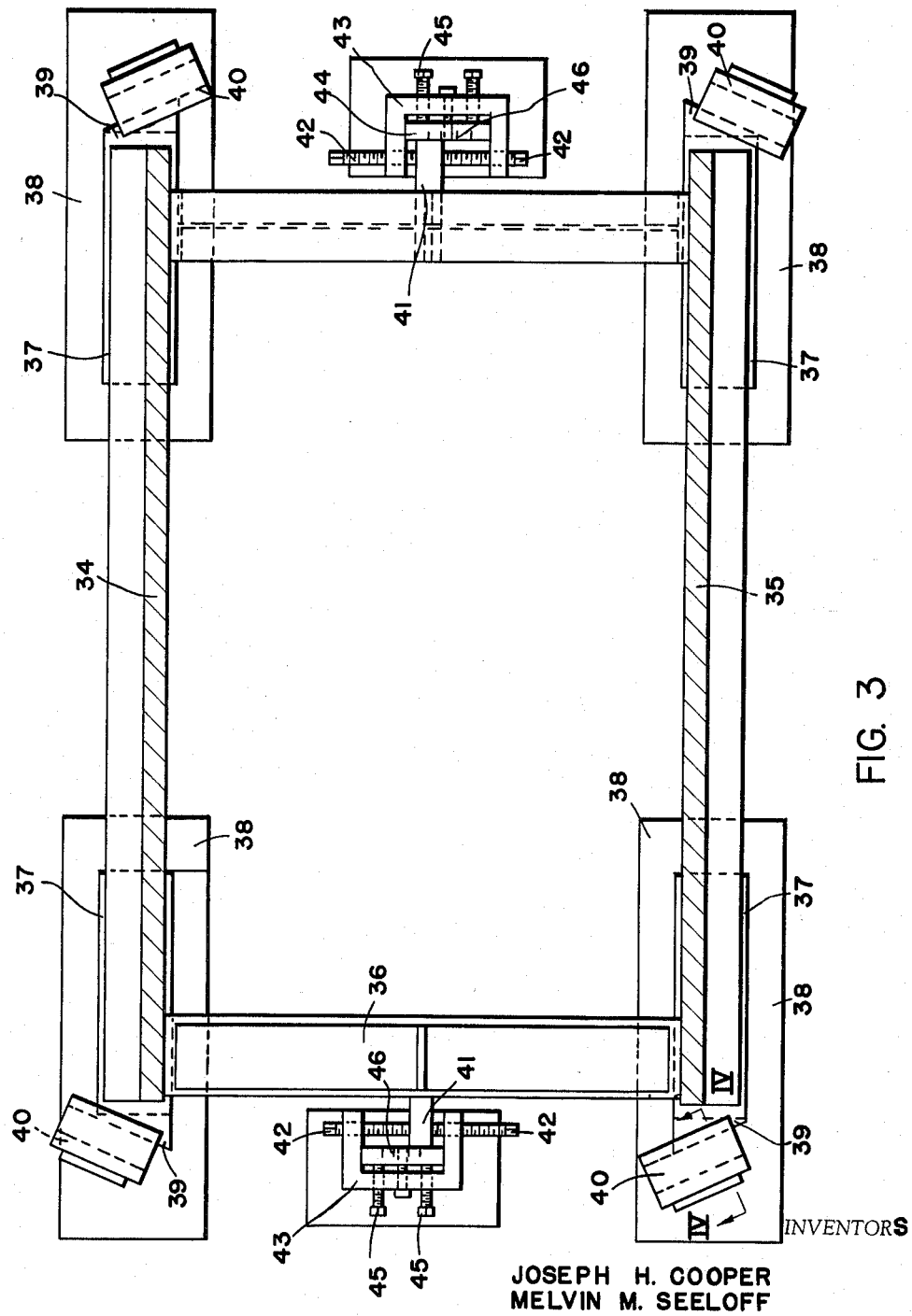

May 3, 1966   J. H. COOPER ETAL   3,249,732
FLASH WELDING APPARATUS
Filed Jan. 5, 1960   7 Sheets-Sheet 3

INVENTORS
JOSEPH H. COOPER
MELVIN M. SEELOFF
BY *Francis J. Klempay*
ATTORNEY

INVENTORS:
JOSEPH H. COOPER
MELVIN M. SEELOFF
BY Francis J. Klempay
ATTORNEY

May 3, 1966 J. H. COOPER ETAL 3,249,732
FLASH WELDING APPARATUS
Filed Jan. 5, 1960 7 Sheets-Sheet 5
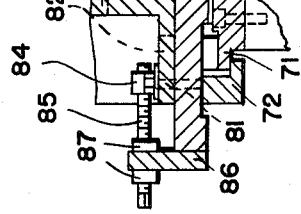
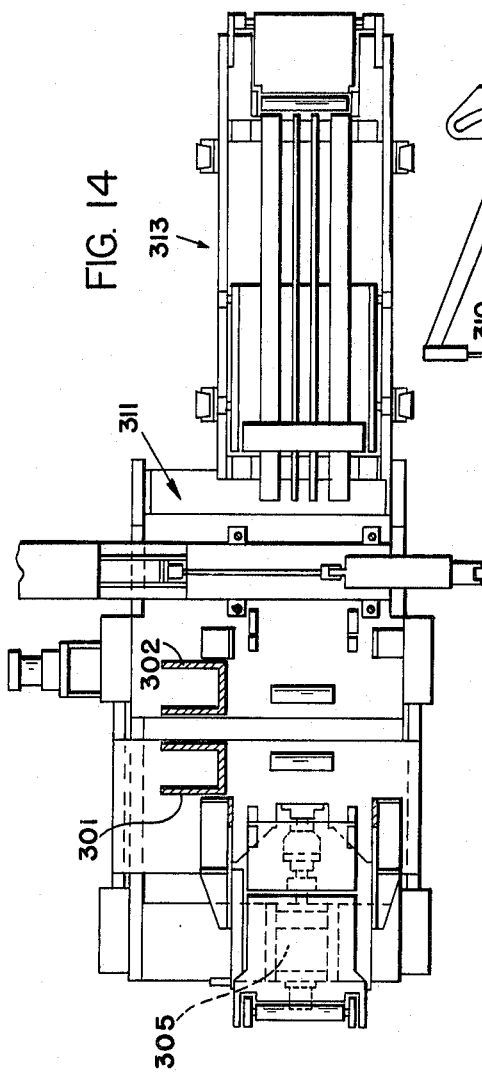
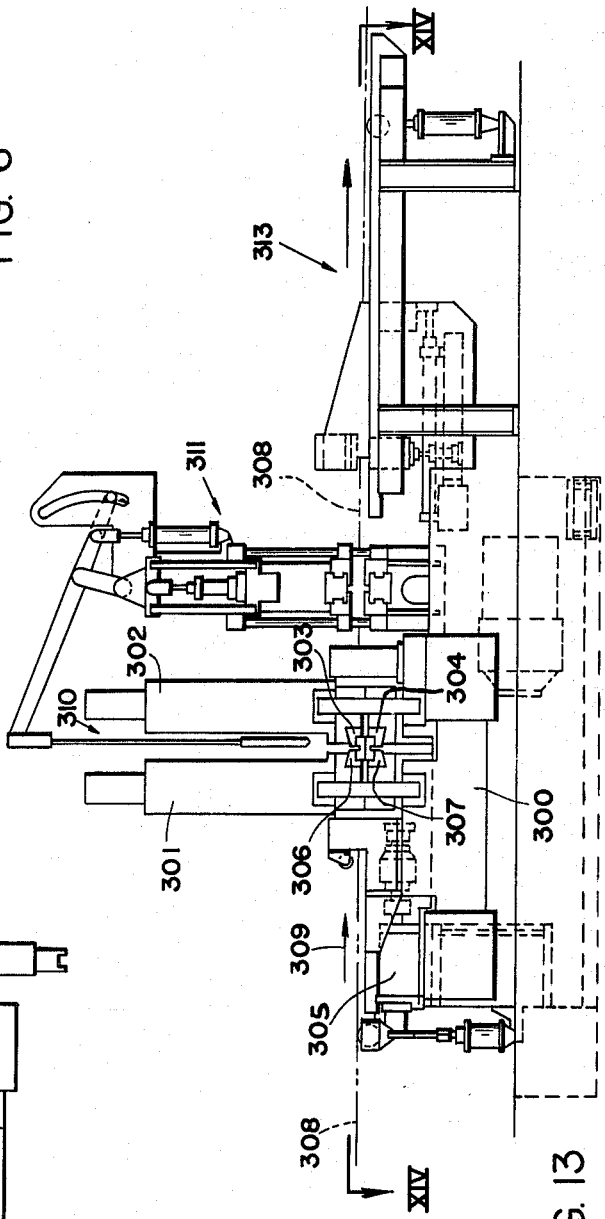
INVENTORS
JOSEPH H. COOPER
MELVIN M. SEELOFF
BY *Francis J. Klempay*
ATTORNEY

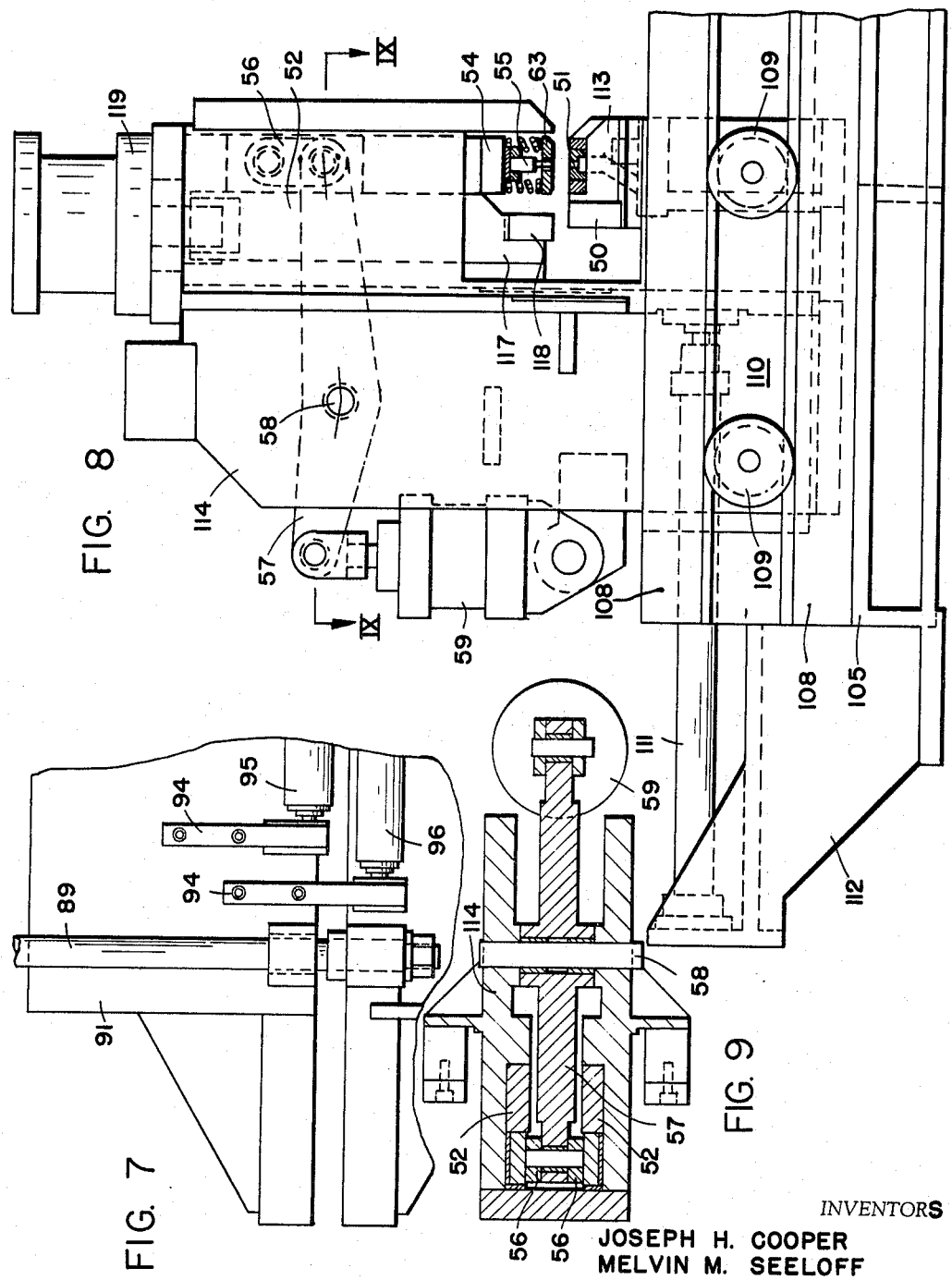

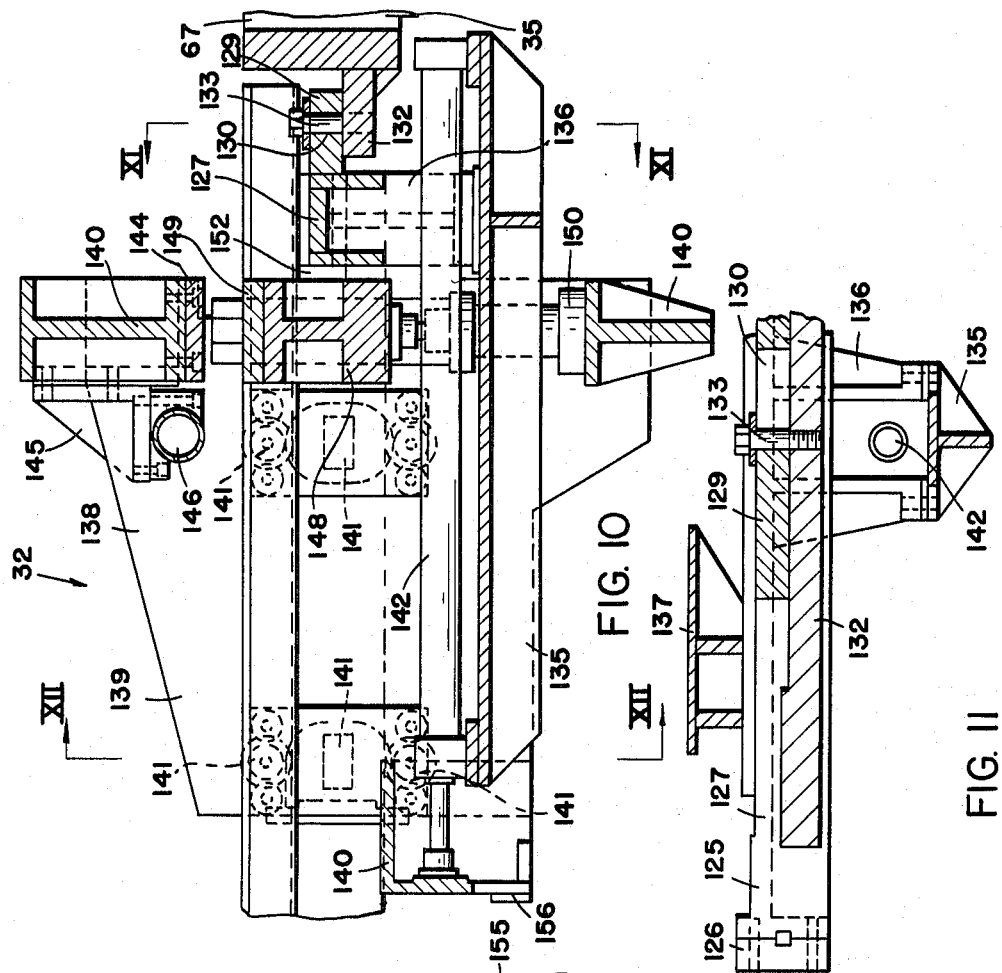
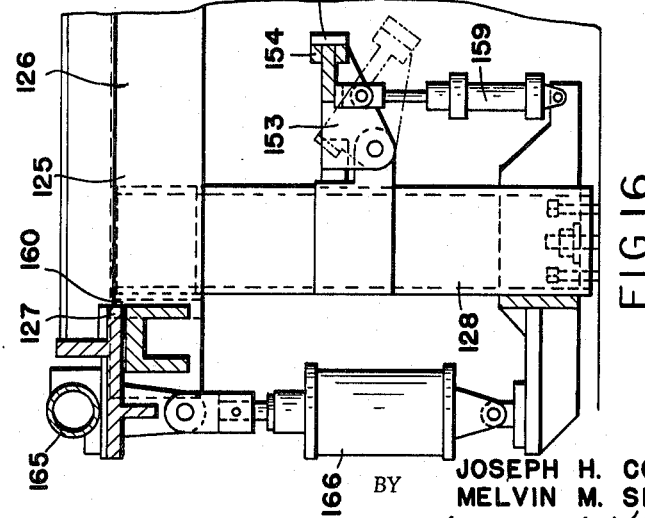

United States Patent Office 3,249,732
Patented May 3, 1966

3,249,732
FLASH WELDING APPARATUS
Joseph H. Cooper and Melvin M. Seeloff, Warren, Ohio, assignors to The Taylor-Winfield Corporation, Warren, Ohio, a corporation of Ohio
Filed Jan. 5, 1960, Ser. No. 660
11 Claims. (Cl. 219—97)

The present invention relates generally to the welding art and more particularly to the provision of highly improved and simplified flash welding apparatus.

It is the primary or ultimate object of the present invention to provide combined apparatus which is capable of performing a plurality of operations on strips or other like workpieces which have heretofore been completed by a plurality of individual machines. For example, a complete operational cycle of our apparatus may comprise the steps of gauging, positioning and flash welding the ends of adjacent strips, then moving the welded strips to a weld trimming means, trimming the excessive weld flash or expulsion from the weld, moving the welded strips to a notching and punching means and then notching and punching the side edges of the welded strips. The flash welding apparatus herein disclosed provides in a single machine means to flash weld the strips, means to trim the welding flash from the welded strips, means to notch and punch the side edges of the welded strips and means to automatically transfer the welded strips from the welding means to the weld trimming means and then to the notching and punching means.

Another object of the present invention is to provide flash welding apparatus wherein the time required for flash welding and otherwise working the strips is substantially reduced when compared to prior art apparatus for a similar purpose and wherein this time is reduced to an absolute minimum. The above is particularly important when apparatus of this general type is employed in a continuous processing line—such as joining the adjacent ends of metal strips in an automated strip pickling line, for example. The provision of combined flash welding apparatus allows a substantial reduction in the spacing between the various component parts thereof which have heretofore been furnished as individual machines. This, in combination with other features of the present apparatus, allows the flash welding and other ancillary operations to be completed in an automatic manner and in a minimum of time.

Yet another object of the invention is to provide combined flash welding apparatus which embodies improved and highly simplified weld trimming means and/or notching and punching means. These means are very rigidly supported while yet the housing members and base frame are of relatively light weight construction and are adapted to be adjusted in any easy manner as will be hereinafter more fully explained.

Still another object of the invention is to provide flash welding apparatus which embodies new and novel means for adjusting the position of the various component parts thereof with respect to the normal path of strip travel and with respect to each other. These adjustments include means to change the angular relation between the flash welding apparatus and the normal path of strip travel. In some instances it may be desirable to weld the adjacent ends of the strips along a line which is angled across the width thereof to better facilitate the passage of the welded joint through other strip processing apparatus, such as pinch rolls, roller levellers, etc.

A further object of the invention is to provide improved means for effecting longitudinal movement of the welded strips from the welding die assemblies to the weld trimming means and then to the notching and punching means in an automatic and highly controlled manner. This transfer means comprises a longitudinally movable transfer clamp which is adapted to clamp and positively move the welded strips.

Yet a further object of the invention is to provide means for adjusting the longitudinal spacing between the flash welding means and the weld trimming and notching and punching means. This adjustment is provided to allow longitudinal alignment of the weld with the weld trimming means and the notching and punching means if, for some reason, the transfer means is not employed and the welded strips are moved by the ancillary strip handling apparatus of the continuous processing line.

The above, as well as other objects and advantages, will become more readily apparent upon consideration of the following specification and accompanying drawing wherein there are disclosed certain preferred embodiments of flash welding apparatus constructed in accordance with the teachings of our present invention.

In the drawing:

FIGURE 3 is a plan sectional view as seen from the section line III—III of FIGURE 1 showing specifically the means employed for skewing a portion of the flash welding apparatus with respect to the normal path of strip travel;

FIGURE 6 is a fragmentary end sectional view taken along the section line VI—VI of FIGURE 5;

FIGURE 7 is an enlarged and fragmentary end view of the weld trimming means;

FIGURE 8 is an end view showing a portion of the notching and punching means utilized in the flash welding apparatus;

FIGURE 9 is a fragmentary plan sectional view taken along the section line IX—IX of FIGURE 8;

FIGURE 10 is a longitudinal sectional view of the strip transfer means embodied in the present apparatus;

FIGURE 11 is a fragmentary end sectional view taken along the section line XI—XI of FIGURE 10;

FIGURE 13 is a side elevational view of a second embodiment of flash welding apparatus constructed in accordance with the teachings of this invention;

FIGURE 14 is a plan sectional view taken along a section line XIV—XIV of FIGURE 13;

FIGURE 16 is an enlarged and more detailed view of the left end of FIGURE 1.

Figures 1, 2:
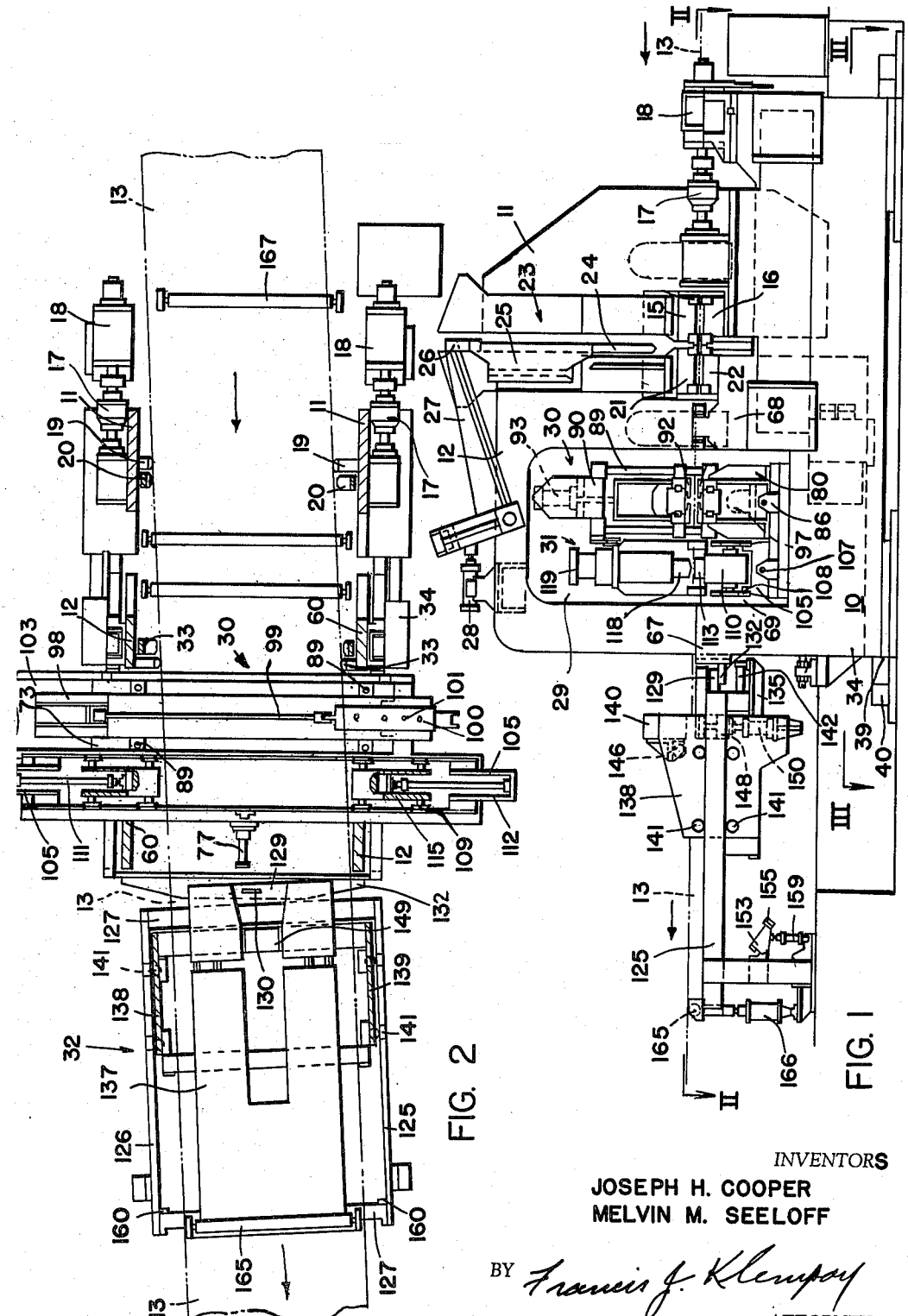
FIGURE 1 is a side elevational view of flash welding apparatus constructed in accordance with the teachings of this invention.
FIGURE 2 is a plan sectional view taken along the section line II—II of FIGURE 1.

Referring now to the drawing, and initially to FIGURES 1 and 2 thereof, there is shown flash welding apparatus which comprises a base structure 10 upon which are mounted a pair of inwardly facing C-shaped housing members 11 and 12. The housing members 11 and 12 are disposed in spanning relation with respect to a normal path of strip travel 13. The direction of strip travel is represented by the arrows in the various views of the drawing. The C-shaped housing member 11 is slidably mounted for longitudinal movement with respect to the base structure 10 and the C-shaped housing member 12. Mounted in the center opening of the C-shaped housing member 11 are a pair of movable upper and lower welding die assemblies 15 and 16 and means are provided, not particularly shown, for effecting relative vertical movement between these welding die assemblies for clamping the leading end of a strip therebetween.

The C-shaped housing member 11 is adapted to be moved longitudinally along the normal path of strip travel 13 by means of various hydraulic cylinders 17 and 18 which are disposed on opposite sides of the normal path of strip travel. This actuating apparatus is preferably constructed and operated in accordance with the teachings of U.S. Patent No. 2,794,111, which is assigned to the assignee of the present invention. The movable housing member 11 spans the normal path of strip travel 13 and mounts transversely spaced strip centering shoes 19 and fixed strip guides 20 for properly aligning and transversely positioning the end of a leading strip.

The C-shaped housing member 12 is rigidly and relatively stationarily mounted with respect to the base structure 10 and the relatively movable C-shaped housing member 11. Mounted in the opening of the housing member 12 are a pair of upper and lower stationary welding die assemblies 21 and 22. Means, not particularly shown, are provided for effecting relative vertical movement between the welding die assemblies 21 and 22 whereby the end of a trailing strip may be firmly clamped therebetween. Mounted from the housing member 12 is a gauge bar means generally designated by the reference numeral 23 which comprises spacer bar 24 that extends transversely across the normal path of strip travel and is rigidly secured at its upper end to a vertically disposed carrier 25. The carrier 25 is loosely guided for vertical movement and pivotally secured to the upper end thereof is a short link 26 which is in turn pivotally secured to a lever arm 27. A fluid cylinder 28 is provided for vertically pivoting the lever arm 27 which causes carrier 25 and the spacer bar 24 to move vertically and also horizontally to a certain extent since there is a horizontal component of movement in the arcuate movement of the lever arm 27. The spacer bar 24 may comprise a plurality of stepped parallel gauge faces for very accurately and quickly gauging the desired separation between the adjacent ends of the strips being welded. The construction and operation of the gauge bar means 23 is more fully described in U.S. Patent No. 2,758,184, which is assigned to the assignee of this invention.

The C-shaped housing member 12 is somewhat larger than the movably mounted housing member 11 and is provided with a large rectangular and transversely extending opening 29 therein which is disposed forwardly of the welding die assemblies 21 and 22. Mounted within the window-like opening 29 in transversely aligned and longitudinally spaced side-by-side relation are weld trimming means and notching and punching means that are generally designated by the reference numerals 30 and 31, respectively. Supported by and positioned forwardly of the C-shaped housing member 12 in the direction of strip travel is a transfer means 32 that is adapted to transfer the welded strips from the welding die assemblies to the weld trimming means 30 and then to the notching and punching means 31 in a very fast and highly efficient manner. The relatively stationary C-shaped housing 12 spans the normal path of strip travel and, in accordance with usual practice, is provided with suitable strip centering shoes and fixed strip guides 33.

In the overall operation of the flash welding apparatus, the end of a trailing strip, which has preferably been squared by an external shear, not shown, is moved by ancillary strip handling equipment, also not shown, past the center line of the welding die assemblies. The spacer bar 24 is then moved downwardly into a predetermined gauging position between the pairs of welding die assemblies in obstructing relation with respect to the normal path of strip travel. The end of the trailing strip is then moved rearwardly against the gauging surface of the spacer bar and the various shoes and guides 33, along with a vertically movable exit looper roll 165 which is adapted to be moved by a fluid looper cylinder 166, are operated to center the end of the trailing strip. The upper welding die assembly 21 is now lowered to very firmly clamp the end of the trailing strip between the welding die assemblies 21 and 22. The end of a leading strip, which has been previously cropped in an external shear, not shown, is advanced into engagement with the proper gauging surface of the spacer bar 24 and is transversely aligned with respect to the end of the trailing strip by an entry side looper roll 167, the strip centering shoes 19 and the strip guides 20. The upper welding die assembly 15 is lowered to very firmly clamp the end of the strip between the welding die assemblies 15 and 16. The movably mounted C-shaped housing member 11 is moved rearwardly a predetermined distance upon proper actuation of the fluid cylinders 17 whereby the spacer bar 24 may be retracted. The movably mounted housing member 11 and the end of the leading strip are then advanced toward the end of the trailing strip and electrical current is supplied by means, not shown, to the welding die assemblies to cause arcing or flashing between the adjacent ends of the strips. The ends of the strips are softened by this flashing or arcing and upon continued movement of the housing member 11 the ends of the strips engage each other and the fluid cylinders 18 provide the necessary upset force which fuses the ends of the strips to each other.

The transfer means 32 firmly clamps the trailing strip and, as soon as the welding die assemblies are retracted from clamping relation with respect to the strips, moves the welded strips until the weld is aligned with the weld trimming means 30. The weld trimming means 30 is then actuated to remove excess welding flash and/or weld expulsion from the strips. The transfer means 32 is now actuated to move the welded and trimmed strips forwardly to the notching and punching means 31 and at this station the side edges of the welded strips are very quickly and efficiently notched and the strips are punched adjacent the side edges thereof. Thereafter the flash welding apparatus is completely opened and the welded strips are free to be moved therethrough.

The specific construction and utilization of the various component parts of the flash welding apparatus will become more fully apparent upon consideration of the following portions of the specification.

*Base Structure*

Considering first the construction of the base structure 10, it should be understood from the outset that the relatively large C-shaped housing members 11 and 12 must be very rigidly and accurately mounted and/or guided if acceptable flash welding operations are to be completed. The base structure of the present invention accomplishes this end and, in addition, provides a means for skewing the entire flash welding apparatus, with the exception of the transfer means, with respect to the normal path of strip travel.

Figure 4:
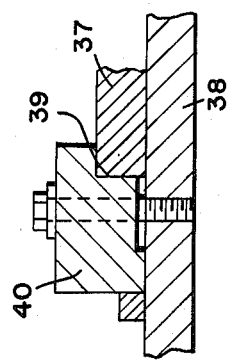
FIGURE 4 is a fragmentary side sectional view taken along the section line IV—IV of FIGURE 3.

Referring now to FIGURES 3 and 4 of the drawing, the base structure 10 comprises a very large and rigid generally rectangular base frame 34 which is fabricated from the elongated and longitudinally extending side plates 35 and spaced transversely extending cross members 36. Attached to the underside of the base frame 34 adjacent the corners thereof by bolts or other convenient attachment means are wear plates 37. The wear plates 37 are adapted to overlie and engage wear plates 38 that are in turn rigidly attached to a suitable foundation or supporting base. It will be noted that a projecting end 39 of each of the wear plates 37 is received in a groove provided by a plurality of L-shaped keepers 40 which are bolted in a very rigid manner to the wear plates 38. The arrangement is such that the base frame 34 is adapted to have limited rotational movement whereby all apparatus carried thereon may be skewed or disposed in a predetermined angular relationship with respect to the normal path of strip travel.

To very accurately control and adjust the angular disposition of the base frame 34 each of the main cross members 36 thereof has a projecting abutment bar 41 extending longitudinally therefrom. The opposite side edges of each of the abutment bars 41 are engaged by the ends of a pair of bolts 42 which are threadably received in opposed relation at the ends of a U-shaped bracket 43. A gauging and locking bar 44 which is disposed between the forward edge of the abutment bar 41 and the ends of a pair of locking bolts 45 which are also threadably received in the U-shaped bracket 43. The upper surface of the gauging and locking bar 44 is provided with suitable indicia 46 which, in cooperation with a reference mark on the abutment bar 41, serves as a means for indicating the angled relation of the base frame and all other parts carried thereby with respect to the normal path of strip travel. The locking and gauging bar 44 is also adapted to very tightly lock the base frame 34 in any angularly adjusted position upon proper manipulation of the locking bolts 45. It will be noted that the above described apparatus is provided on each end of the base frame 34 and, of course, the various pairs of bolts 42 and 45 will be manipulated together in such a manner that the base frame moves to or is locked in the desired angled or skewed relation with respect to the normal path of strip travel. In some cases it is desirable to weld the strips along a line which is angled with respect to the normal path of strip travel since the angled weld passes more easily through other processing equipment.

The arrangement is such that all apparatus mounted from the base frame—including the C-shaped housing members 11 and 12, the weld trimming means 30 and the notching and punching means 31 but excluding the transfer means 32—may be rotated slightly to an angled or skewed relation with respect to the normal path of strip travel in a very accurate manner. It is contemplated that the means for adjustably positioning the flash welding apparatus in skewed relation with respect to the normal path of strip travel will be infrequently employed—such as when the machine is being installed at the point of use to properly align the apparatus with respect to the normal path of strip travel or when the same is being prepared for different size or kinds of strips. Consequently the above described adjustment means are shown to comprise manually adjustable bolts but it should be understood that these may be replaced with other apparatus providing powered and automatic adjustment through various control instrumentalities.

The side plates 35 of the base frame extend vertically upward for a substantial distance and are so transversely spaced that the lower ends of the transversely spaced side members 60 of the C-shaped housing members 11 and 12 are nestingly received therebetween. The entry side of the upstanding side plates 35 and the movable housing member 11 are provided with cooperating slides and ways, not shown, whereby the housing member 11 and all apparatus carried thereby are adapted to have very accurate longitudinal movement in a horizontal plane upon proper actuation of the fluid cylinders 17 and 18. Also, in accordance with usual practice, the exit side of the side plates 35 and depending portions of the housing member 12 are provided with cooperating inclined slides and ways, also not shown, in order that the welding die assemblies carried by the housing member 12 may be vertically aligned with respect to the welding die assemblies carried by the movable housing member 11 in a very accurate manner.

Figure 5:
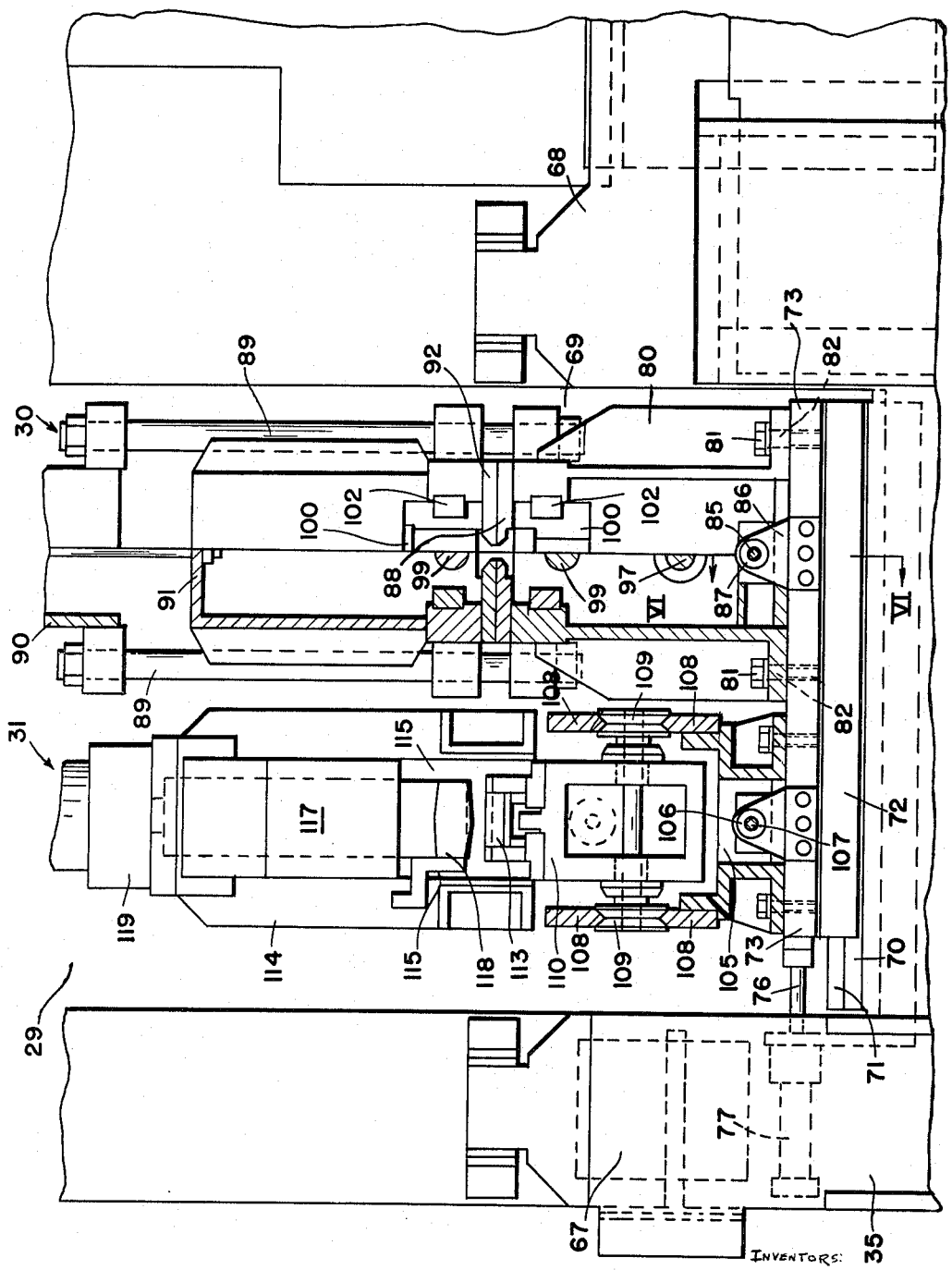
FIGURE 5 is an enlarged fragmentary side elevational view depicting specifically the weld trimming and notching and punching means embodied in the flash welding apparatus of the present invention.

As will be noted in FIGURE 5 of the drawing, each of the side plates 35 of the base frame 34 is generally U-shaped in side elevation at the exit end thereof and has a pair of longitudinally spaced and vertically extending leg portions 67 and 68 which define an elongated opening 69 therein which is aligned substantially with the window-like center opening 29 in the C-shaped housing member 12. The top edges of the side plates 35 adjacent the opening 69 are spanned by a transversely extending and longitudinally elongated mounting plate 70 which is bolted to the side plates 35 and completely fills the bottom of the opening 69. The opposite side edges of the mounting plate 70 terminate in outwardly projecting side guides 71 while the center of this mounting plate has attached thereto a generally rectangular and longitudinally extending center guide, not shown. The outwardly projecting side guides 71 of the mounting plate 70 are slidably engaged by L-shaped slides 72 which are mounted in depending relation from the opposite side edges of a slide plate 73. The slide plate 73 extends transversely across the base frame 34 below the normal path of strip travel and is formed with a slide channel intermediate its ends, not shown, which nestingly and slidably receives the upstanding center guide of the mounting plate 70. The arrangement is such that the slide plate 73 is very accurately mounted for longitudinal sliding movement with a minimum of friction in a plane parallel to the normal path of strip travel.

The rear end of the slide plate 73 is connected to the piston rod 76 of a slide plate adjustment cylinder 77 which is mounted from the base frame 34. Upon proper actuation of the slide plate adjustment cylinder 77 the slide plate 73 will be moved longitudinally and so will the weld trimming means 30 and the notching and punching means 31 mounted thereon. When the transfer means 32 of the flash welding apparatus is employed the slide plate adjustment cylinder 77 is not actuated and the slide plate, along with the weld trimming means and the notching and punching means, are maintained in a predetermined longitudinal spaced relation with respect to the welding die assemblies mounted on the C-shaped housing member 12. However, when the transfer means 32 is not employed—such as when this transfer means is being repaired—the welded strips are moved to the weld trimming and notching and punching means by ancillary and associated external strip moving apparatus, not shown. Such apparatus is not adapted to index the welded strips in the accurate manner of the transfer means 32 and consequently the weld may be disposed a short distance longitudinally of the center line of the weld trimming means or the notching and punching means. In this situation the slide plate adjustment cylinder 77 is actuated to slidably and longitudinally move the slide plate 73 until the center line of the weld trimming means or the notching and punching means is aligned with respect to the weld.

*Weld trimming means*

After the strip ends have been welded the transfer means is operative, in a manner to be later described, to move the welded strips longitudinally until the weld is aligned with the center of the weld trimming means 30 and it is the function of this means to very quickly trim the excess weld expulsion or flash from the weld in a highly efficient manner. The weld trimming means 30 is mounted at the forward end of the large opening 29 in the C-shaped stationary housing member 12 and comprises a supporting base 80 which is adjustably secured to the forward portion of the slide plate 73 by bolts 81 which extend through transversely elongated apertures 82 in the mounting flanges of the supporting base 80. One side mounting flange of the supporting base 80 carries a vertically extending and internally threaded fitting 84 which receives the threaded end of a trimmer adjustment bolt 85. The rear end of the trimmer adjustment bolt 85 extends through an aperture in a plate 86 which is attached to a side edge of the slide plate 73. A pair of retaining rings 87 are pinned to the trimmer adjusting bolt 85 on opposite sides of the upstanding plate 86 and the arrangement is such that when the bolts 81 are loosened and upon proper turning movement of the trimmer adjusting bolt 85 the supporting base 80 for the weld trimming means will be moved transversely with respect to the normal path of strip travel. This adjustment means allows the weld trimming means 30 to be positioned in proper transverse alignment with respect to the normal path of strip travel when the flash welding apparatus is assembled at the point of use and is also employed to move the weld trimming means into proper alignment with the normal path of strip travel after the base frame 34 has been moved into or from an angled or skewed relation with respect to the path of strip travel.

The supporting base 80 extends upwardly and rigidly mounts a longitudinally spaced pair of stationary lower clamping platens 88 whose upper surfaces are disposed directly below the normal path of strip travel. Also carried by the supporting base 80 at the corners thereof are four vertically extending guide rods 89 which are positioned outwardly of the normal path of strip travel. The upper ends of the guide rods 89 terminate in a top housing 90 and slidably received for vertical movement on these rods is an upper clamping assembly 91 which comprises a pair of longitudinally spaced and transversely extending upper clamping platens 92. The upper clamping assembly 91 is attached to the piston rods of a pair of trimer clamp cylinders 93 which are mounted in the top housing 90. Upon proper energization of the trimmer clamp cylinders 93 the clamping assembly 91 will be lowered whereby the welded strips are firmly and rigidly clamped between longitudinally spaced pairs of the upper and lower clamping platens 92 and 88. The clamping platens 92 and 88 extend transversely across the normal path of strip travel whereby the welded strips are clamped across its entire width.

After the welded strips have been clamped between the spaced pairs of clamping platens 88 and 92 a long stroke trimming cylinder 97 which is mounted within the confines of the supporting base 80 is actuated to drive a weld trimming carriage 98 transversely outwardly from a normal path of strip travel. Carried by the trimming carriage 98 are a pair of transversely extending and elongated pull rods 99 that are disposed in generally vertical parallel relation above and below the normal path of strip travel and pivotally attached to the forward end of each of the elongated pull rods 99 is a trimming tool carrier 100 that mounts a plurality of transversely spaced removable trimming tools 101. The tool carriers 100 are provided with ways on the opposite side faces thereof which are adapted to slide on transversely spaced guide bars 102 which are attached to the clamping assembly 91 and the supporting base 80 adjacent the various clamping platens. When fluid is supplied in a proper manner to the weld trimming cylinder 97 after the welded strips have been clamped the tool carriers 100 are drawn transversely across the welded strips with the timming tools 101 cutting or skiving the excess flash from the weld. Of course, the tool carriers 100 must travel completely across the normal path of strip travel and a supporting structure, indicated rather schematically by the reference numeral 103, is adapted to support the trimming carriage 98 during its movement outwardly of the C-shaped housing member 12.

Attached to each end of the vertically movable upper clamping assembly 91 by means of depending brackets 94 are vertically spaced and transversely extending upper and lower strip supporting rolls 95 and 96, respectively. The upper strip supporting rolls 95 are positioned above the normal path of strip travel whereby the lowermost peripheral edges thereof are disposed in a plane slightly below the lower faces of the upper clamping platens 92. The lower strip supporting rolls 96 are journaled by the brackets 94 and are disposed below the normal path of strip travel. The arrangement is such that when the upper clamping assembly 91 is moved vertically upward to its retracted position, as shown in FIGURES 1 and 7 of the drawing, the upper peripheral edges of the lower strip supporting rolls 96 are disposed above the upper faces of the lower clamping platens 88. When the clamping assembly 91 is retracted the lower strip supporting rolls 96 maintain the strips in elevated relation with respect to the lower clamping platens 88 and the lower trimming tools 101 thereby protecting the same. The upper strip supporting rolls 95 serve to protect the clamping surfaces of the upper clamping platens 92 and the upper trimming tools and in this manner the welded strips are adapted to pass through the weld trimming means in a free and easy manner without damage to either the strips or the clamping platens, trimming tools, etc. thereof.

As should now be readily apparent, the weld trimming means is adapted to trim the flash or expulsion from the weld in a fast and efficient manner. For those desiring a more detailed description of such flash trimming means reference should be had to co-pending patent application Serial No. 26,792, filed May 4, 1960, now Patent No. 3,046,384 which is assigned to the assignee of the present invention.

*Notching and punching means*

The notching and punching means 31 of the present flash welding apparatus is operative to notch the side edges of the welded strips at the line of weld which has been found desirable and to punch apertures in the welded strips. The punched apertures may serve as the actuating means for photoelectric control apparatus which in turn controls other equipment in the continuous processing line, for example. The notching and punching means 31 comprises an elongated and transversely extending supporting base 105 which is bolted to the slide plate 73 rearwardly of the weld trimming means 30. The supporting base 105 is adapted to be adjusted transversely with respect to the normal path of strip travel by means of a notching and punching adjustment assembly 106 which comprises an adjusting bolt 107 and whose construction and operation is generally similar to the transverse adjustment means 81–87 provided for the weld trimming means 30. To avoid repetition in the specification the structure of the transverse adjusting means 106 for the notching and punching means 31 will not be further described.

The supporting base 105 mounts two longitudinally spaced pairs of rails 108 which extend transversely across and below the normal path of strip travel. The rails of each longitudinally spaced pair thereof are vertically spaced and are adapted to be engaged at transversely spaced points by anti-friction rollers 109 which are rotatably supported from a transversely movable carriages 110. One of the carriages 110 is provided adjacent each side edge of the normal path of strip travel and each of these carriages mounts one of the anti-friction rollers 109 at each corner thereof. The arrangement is such that the carriages 110 and all apparatus carried thereby are mounted for accurate transverse movement with a minimum of friction. To move the carriages 110 relatively long stroke fluid cylinders 111 are mounted from suitable support portions 112 of the supporting base 105 and their piston rods are drivingly connected to the carriages 110.

One of the carriages 110 comprises a transversely and inwardly facing C-shaped housing 114 which mounts at the lower edge of the opening therein an anvil die assembly 113. The anvil die assembly 113 has an anvil notching die 50 and, spaced inwardly from the anvil notching die 50 and disposed on opposite sides thereof, are a pair of punching dies 51. Slidably guided in the C-shaped housing 114 for vertical movement is an upper notching die carrier 117 that mounts an upper notching die 118. The upper die carrier 117 is connected by a pair of spaced links 52 to the piston of a fluid notching cylinder 119 that is mounted on top of the C-shaped housing 114.

Also guided in the C-shaped housing 114 for vertical movement is a punching die carrier 54 which mounts a longitudinally spaced pair of punches 55 that are adapted to cooperate with the punching dies 51 in punching notches in the welded strips. The punching die carrier 54 is pivoted adjacent its upper end to a pair of depending links 56 whose lower ends are in turn pivoted to the forwardly projecting arm of a bellcrank 57. The bellcrank 57 extends rearwardly and is pivoted intermediate its ends by a pin 58 to the C-shaped housing 114. The rear end of the bellcrank is drivingly connected to a punching cylinder 59 that is vertically mounted on the outer face of the housing 114.

The arrangement is such that upon proper energization of the fluid cylinder 111 the carriage and all apparatus carried thereby will be moved inwardly until the anvil notching die 50 and the punching dies 51 are disposed beneath the side edge of the welded strips. Then the notching cylinder 119 is actuated to reciprocate the upper notching die carrier 117 whereby the upper notching die 118 and the anvil notching die 50 cooperate in notching the side edge of the welded strips. Preferably the notching dies 118 and 50 are formed to provide a curved or rounded notch. Also, the punching cylinder 59 is actuated to reciprocate the punching die carrier 54 whereby suitable longitudinally spaced apertures disposed on opposite sides of the weld are punched in the welded strips by the cooperating punching dies 51 and punches 55. The notching and punching means comprises other apparatus such as spring biased stripper plates 63 for the punches 55, discharge chutes, not particularly shown, for the scrap, safety cover plates, etc. as are required in completing notching and punching operations in a minimum of time.

The other of the carriages 110, not particularly shown, mounts apparatus generally similar to the apparatus above described with the exception that the punching means—including punching dies 51, punches 55, punching die carrier 54, links 56, bellcrank 57, punching cylinder 59, etc.—is not provided. Thus, this carriage carries only notching means of the type above described whereby the welded strips are notched at both side edges thereof but longitudinally spaced apertures on opposite sides of the weld are provided adjacent only one side of the welded strips. Of course, it should be clearly understood that punching means may be provided for both of the carriages if such an arrangement is desired. Also, the construction is such that the punching means may be operated independently of the notching means and vice versa.

*Transfer means*

Figure 12:
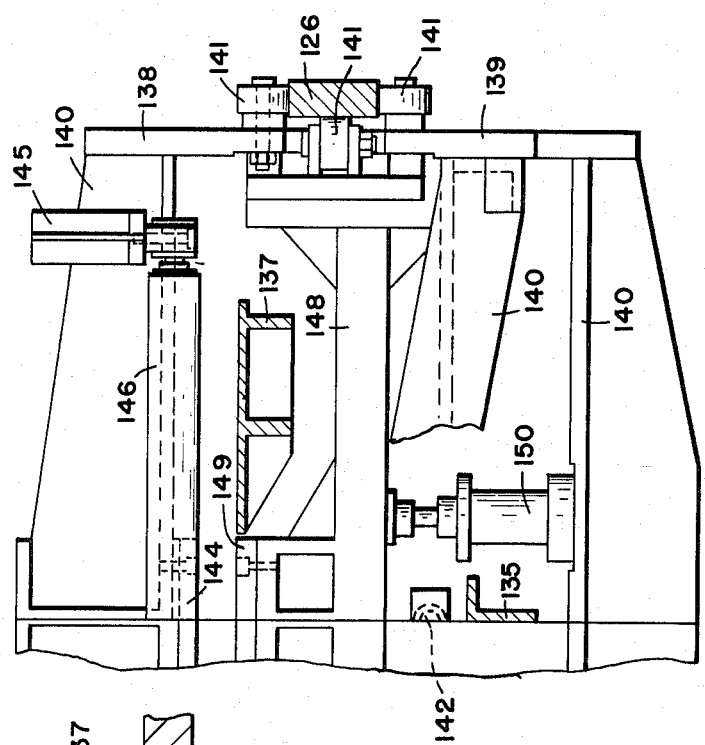
FIGURE 12 is a half end sectional view taken generally along the section line XII—XII of FIGURE 10.

The transfer means 32 is shown more particularly in FIGURES 10–12 of the drawing and comprises a longitudinally elongated and generally rectangular supporting frame 125 which is fabricated from a pair of transversely spaced and longitudinally extending side rail members 126 and suitable transversely extending braces 127. The supporting frame is supported in elevated relation adjacent its rear end by a pair of vertically extending structural legs 128 which are firmly bolted or otherwise attached to the foundation or supporting base for the flash welding apparatus. The rear brace 127 carries a rearwardly projecting and transversely elongated extension 129 that has a transversely elongated arcuate slot 130 therein. The extension 129 overlies a transverse plate 132 which spans the forward ends of the leg portions 67 of the side plates 35 forming a portion of the base support 34. The forwardly projecting plate 132 carries a vertically extending headed bolt 133 whose shank portion extends through the transversely elongated aperture 130 in the rearwardly projecting extension 129 of the transfer means 32. The headed bolt 133 provides an inter connection between the base frame 34 and the transfer means 32 in such a manner that the rear end of the rectangular supporting frame 125 is supported by the forwardly projecting plate 132 but yet relative transverse movement between the transfer means 32 and the base frame 34 is provided.

As previously described, the base structure comprises means for changing the angular disposition of or skewing the base frame 34 with respect to the normal path of strip travel while the transfer means is operative to transfer the welded strips from the welding die assemblies to the weld trimming means 30 and then to weld notching and punching means 31. The transfer means 32 must be disposed in generally parallel relation with respect to the normal path of strip travel at all times and regardless of the skewed position of the base frame 34 or the angled relation of the weld if the transfer means is to operate successfully in performing its function in a flash welding operation. The slot 130 in the extension 129 allows relative movement between the transfer means and the base frame whereby the base frame and all apparatus carried thereby may be skewed with respect to the normal path of strip travel but yet the transfer means remains at all times in predetermined relation relative to the normal path of strip travel.

The supporting frame 125 further comprises a transfer cylinder mounting platen 135 which is mounted by a downwardly depending support 136. Also, the upper side edges of the generally rectangular supporting frame 125 are lined with inwardly directed and transversely spaced plates 137 which define a longitudinally extending table-like strip supporting surface.

Movably mounted on the supporting frame 125 is a transfer carriage 138 which is fabricated from a pair of spaced side plates 139 and suitable transversely extending braces 140. The transfer carriage 138 journals a plurality of outwardly extending anti-friction rollers 141 which engage the major surface areas of the side rail members 126 in the manner depicted. It will be noted that four clusters of the anti-friction rollers 141 are disposed along the rail members 126 and these rollers 141 are preferably pre-loaded whereby the transfer carriage 138 is very accurately and rigidly mounted for longitudinal movement with a minimum of friction. A transfer cylinder 142 is supported from the transfer cylinder mounting platen 135 and its piston rod is connected to one of the transversely extending braces 140 for moving the transfer carriage along the supporting frame 125.

One of the transversely extending braces 140 of the transfer carriage 138 is disposed above the normal path of strip travel and has an upper transfer clamping platen 144 attached to the lower face thereof. Also mounted from this brace are a pair of transversely spaced depending brackets 145 which journal a strip supporting roll 146 that extends across the normal path of strip travel. The strip supporting roll 146 provides a means for protecting the upper transfer clamping platen 144 and for guiding the welded strips through the flash welding apparatus.

Slidably mounted for vertical movement in the transfer carriage 138 below the normal path of strip travel is a lower clamping carrier 148 which mounts on its upper surface a lower transfer clamping platen 149. The lower clamping carrier 148 is adapted to be moved vertically by a pair of transfer clamping cylinders 150 mounted on one of the braces 140. The arrangement is such that when the transfer clamping cylinders 150 are properly energized the lower transfer clamping platen 149 will be raised upwardly into clamping relation with respect to the upper transfer clamping platen 144. It will be noted that the transfer clamping platens 144 and 149 do not extend completely across the normal path of strip travel but rather are received within an opening or slot provided between the transversely spaced and table-like strip supporting plates 137. After the welded strips have been clamped between the transfer clamping platens 144 and 149 the transfer cylinder 142 is actuated to index the clamped strips longitudinally.

The transfer means 32 moves the strips from the welding die assemblies to the weld trimming means and then to the notching and punching means and, of course, it is necessary that this indexing movement be accomplished with a high degree of accuracy and precision. For this purpose we provide a pair of transversely spaced and forwardly projecting initial stop blocks 152 adjacent the rear edge of the rectangular supporting frame 125 which are adapted to be engaged by the rear edge of the transfer carriage 138 to define an initial starting position for the same. Intermediate the ends of the supporting frame 125 and pivotally attached to the structural legs 128 are a pair of transversely spaced brackets 153 which carry a stop mounting bar 154 at the ends thereof. Removably mounted from the stop mounting bar 154 at transversely spaced points are intermediate stop blocks 155 which are adapted, at predetermined times, to be engaged by corresponding stop plates 156 mounted on the forward and lower edge of the transfer carriage 138. A pivot stop cylinder 159 is disposed in the center of the supporting frame and has its piston rod drivingly connected to the stop mounting bar 154. The intermediate stop blocks 155 are thus adapted to be pivoted downwardly from the position shown in full lines in FIGURE 10 of the drawing whereby the stop plates 156 on the transfer carriage 138 will not contact the same. In essence, the above described arrangement provides a removable intermediate stop means for limiting forward movement of the transfer carriage and this stop means is positioned in accordance with the indexing movement required to move the welded strips from the welding die assemblies to the weld trimming means 30. After weld trimming operations are completed the intermediate stop blocks 155 are retracted downwardly upon proper actuation of the pivot stop cylinder 159 to allow longitudinal movement of the transfer carriage 138 whereby the welded strips may be moved to the notching and punching means 31.

A further and final stop means for the transfer carriage 138 is defined by a pair of transversely spaced final stop blocks 160 that are removably attached to a transverse brace 127 of the supporting frame 125. The final stop blocks 160 are adapted to be engaged by the forward edge of the transfer carriage 138 and the distance between the faces of the intermediate stop blocks 155 and the final stop blocks 160 is equal to the indexing movement required to move the welded strips from the weld trimming means to the notching and punching means. The various stop blocks 152, 155 and 160 are removably mounted whereby the same may be replaced or adjusted by means of shins to provide the correct indexing movement of the strips for any given use of installation of the flash welding apparatus.

*Second embodiment*

Figure 15:
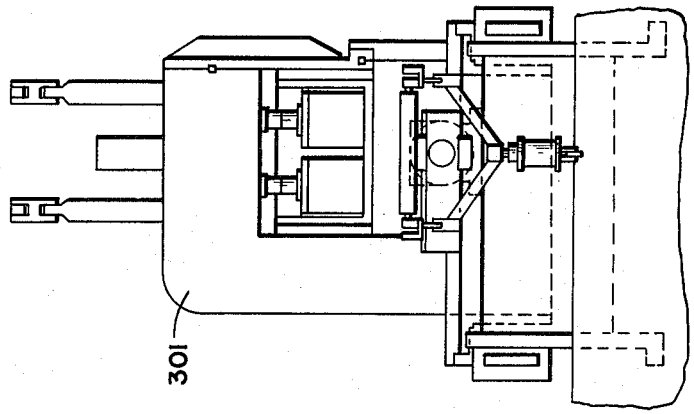
FIGURE 15 is an end elevational view of the flash welding apparatus shown in FIGURE 13.

In FIGURES 13–15 of the drawing there is shown a second embodiment of flash welding apparatus constructed in accordance with the teachings of the present invention. This apparatus comprises a base structure 300 upon which are supported in longitudinally aligned parallel relation a pair of forwardly opening U-shaped housing members 301 and 302. The housing member 302 is relatively stationarily mounted with respect to the base structure 300 and carries upper and lower welding die assemblies 303 and 304. The U-shaped housing member 301 is adapted to be moved longitudinally in a very accurate manner by fluid cylinder 305 with respect to the stationary housing 302 and the base structure 300. This latter C-shaped housing member carries upper and lower welding die assemblies 306 and 307 which are disposed above and below a normal path of strip travel 308. The direction of strip travel through the flash welding apparatus is indicated by the arrows 309.

It will be noted that C-shaped housing members 301 and 302 open to the side of the apparatus and are disposed in aligned side-by-side relation while the housing members 11 and 12 in the first embodiment of the invention are positioned in inwardly facing relation with the openings thereof facing toward each other. In both cases the housing members are C-shaped whereby the substantial clamping forces experienced when strip ends are clamped by the various welding die assemblies are limited to and contained within the C-shaped housing members. While the arrangement shown in the first embodiment of the invention is particularly advantageous since the distances between the welding die assemblies and the weld trimming means and/or the notching and punching means are maintained at an absolute minimum, the disposition of the C-shaped housings 301 and 302 allows an operator to very closely observe the actual flash welding operations. Of course, gauging and spacing means 310 are provided in connection with the apparatus shown in FIGURES 13–15.

Weld trimming means 311 is mounted forwardly of the C-shaped housing members 301 and 302 in the direction of strip travel. Disposed forwardly of the weld trimming means 311 is a transfer means 313 which is similar to the transfer means 32 described in detail above. It will be noted that this flash welding apparatus does not embody a notching and punching means but it should be understood that such a means could be inserted between the weld trimming means 311 and the transfer means 313. Conversely, the notching and punching means 31 in the first embodiment of the invention could be eliminated if the same is not desired in the flash welding apparatus. In all respects the various welding die assemblies, the weld trimming means and the transfer means shown in FIGURES 13–15 are generally similar to the corresponding component parts of the first disclosed embodiment of the invention. Also, the base structure 300 may comprise means to skew the flash welding apparatus with respect to the normal path of strip travel.

*Summary*

It should now be apparent that we have accomplished the objects initially set forth by providing highly improved and simplified flash welding apparatus. Of particular importance is the provision of flash welding apparatus which embodies means to weld the strip ends, weld trimming means and/or notching and punching means whereby the welding operation may be carried out in a minimum of time. Highly simplified transfer means for indexing the welded strips from the welding die assemblies to the weld trimming means and then to the notching and punching means has been disclosed. The disclosed flash welding apparatus also embodies means to change the angular disposition between the same and the normal path of strip travel as is desired in certain uses.

Of course, many changes may be made in the illustrated embodiments of the invention without departing from the clear teachings thereof. Accordingly, reference should be had to the following appended claims in determining the true scope and intent of the invention.

We claim:

1. Flash welding apparatus for welding the adjacent ends of metal workpieces lying in a normal path of workpiece travel which comprises a first pair of welding die assemblies, a second pair of welding die assemblies, said pairs of welding die assemblies extending transversely across the normal path of workpiece travel, means to longitudinally move one of said pair of welding die assemblies toward and away from the other pair of said welding die assemblies, housing means mounting said pairs of said welding die assemblies, and means to angularly move said housing means whereby said pairs of welding die assemblies may be disposed in adjustable skewed relation with respect to said normal path of workpiece travel.

2. Apparatus according to claim 1 further characterized in that said housing means comprises a generally rectangular base frame, a wear plate projecting from each corner of said base frame, and stationary keepers engaging said wear plates.

3. Apparatus according to claim 2 further characterized in that said means to angularly move comprises an abutment bar projecting from said base frame, a stationarily mounted U-shaped bracket, said abutment bar extending into said U-shaped bracket, and a pair oppositely extending bolts threaded in said U-shaped bracket and engaging opposite faces of said abutment bar.

4. Apparatus according to claim 3 further comprising a locking bar received in said U-shaped bracket and adapted to engage the forward end of said abutment bar, locking bolts threadably received in said bracket and engaging said locking bar, and reference indicia on said locking bar to indicate the angular disposition of said base frame.

5. Welding apparatus of the type adapted to weld strip lengths in general end-to-end relation and lying in a normal path of workpiece travel which comprises welding means, said welding means extending transversely with respect to the normal path of workpiece travel, housing means mounting said welding means, a sub-base supporting said housing means and means to angularly move said housing means on said sub-base whereby said welding means may be disposed in adjustable skewed relation with respect to said normal path of workpiece travel.

6. Flash welding apparatus for welding the adjacent ends of metal workpieces which comprises longitudinally disposed pairs of welding die assemblies, means to move one of said pairs of welding die assemblies toward and away from the other of said pairs of welding die assemblies, a supporting base, a housing mounted on said supporting base, said housing mounting one of said pairs of welding die assemblies, said housing having an opening therein disposed longitudinally of said one of said pairs of welding die assemblies, means for working on the welded workpieces, said supporting base having a pair of transversely spaced and upstanding side walls, a slide plate mounted from and spanning said side walls adjacent said opening in said housing, means to longitudinally move said slide plate, and said means for working being mounted on said slide plate within said opening in said housing and being adapted for longitudinal movement with respect to said pairs of welding die assemblies.

7. Flash welding apparatus of the type having longitudinally spaced pairs of welding die assemblies, means to longitudinally move one of said pairs of welding die assemblies toward and away from the other of said pairs of welding die assemblies, weld trimming means, said weld trimming means being mounted longitudinally of said pairs of welding die assemblies, means for moving the welded workpieces from said pairs of welding die assemblies to said weld trimming means, said means to move comprising a transfer table, a clamping carriage mounted for longitudinal sliding movement on said transfer table, and workpiece clamping means carried by said clamping carriage.

8. Apparatus according to claim 7 further characterized in that said welding apparatus comprises weld notching means disposed longitudinally of said weld trimming means and said pairs of welding die assemblies, said transfer table comprising intermediate stop means, means to move said intermediate stop means between operative and inoperative positions, and said intermediate stop means being engaged when in operative position by said carriage to properly position said welded workpieces with respect to said weld trimming means.

9. Apparatus according to claim 7 further comprising housing means mounting said pairs of welding die assemblies and said weld trimming means, means to skew said pairs of welding die assemblies and said weld trimming means with respect to said normal path of workpiece travel, means supporting said transfer table from said housing means, and said means supporting comprising lost motion means whereby said transfer table remains in predetermined relation with respect to said normal path of workpiece travel.

10. Flash welding apparatus of the type adapted to weld the adjacent ends of metal workpieces which comprises a pair of longitudinally disposed housing members, each of said housing members mounting a pair of welding die assemblies adapted to clamp a workpiece therebetween, said pairs of welding die assemblies being disposed in longitudinally spaced adjacent relation, means to effect longitudinal movement between said pairs of welding die assemblies, means mounted on one of said housing members for working on the welded portions of said workpieces, said means for working being disposed in longitudinally spaced relation with respect to said pairs of welding die assemblies, means abutting said one of said housing members to move said welded workpieces from said pairs of welding die assemblies to said means for working, said means for working comprising weld notching means, said weld notching means comprising a pair of carriages disposed at the opposite side edges of the normal path of workpiece travel, each of said carriages comprising an anvil die and a vertically movable die disposed above and below said normal path of workpiece travel, and means to move said carriages transversely of said normal path of strip travel.

11. Apparatus for joining strip comprising a base having a pair of transversely spaced but longitudinally extending upstanding housings thereon, a first current-conductive strip clamp carried by said base and housings at one longitudinal end of said housings, said housings each having a transverse opening therein longitudinally spaced from said first clamp, a transversely extending flash trimmer housed within said openings and normally fixed with respect to said base and housings, a longitudinally movable slide mounting a second current-conductive strip clamp and supported on said base on the opposite longitudinal side of said first clamp from said trimmer, and means to move said slide longitudinally with respect to said first clamp.

References Cited by the Examiner
UNITED STATES PATENTS

| | | | |
|---|---|---|---|
| 1,071,490 | 8/1913 | Winfield et al. | 219—101 |
| 1,731,541 | 10/1929 | Powell | 219—101 |
| 1,913,029 | 6/1933 | Holmes | 219—101 |
| 1,973,159 | 9/1934 | Vehko | 219—101 |
| 2,212,393 | 8/1940 | Dalton | 219—101 |
| 2,427,409 | 9/1947 | Kirsch | 83—559 |
| 2,544,540 | 3/1951 | Maussnest | 83—559 |
| 2,787,698 | 4/1957 | Schlatter | 219—101 |
| 2,840,687 | 6/1958 | Rae | 219—97 X |
| 2,860,231 | 11/1958 | Stone | 219—97 |
| 2,877,337 | 3/1959 | Evans | 219—97 |

RICHARD M. WOOD, *Primary Examiner.*

MAX L. LEVY, *Examiner.*

T. J. SOBOTA, *Assistant Examiner.*